United States Patent
Ba et al.

(10) Patent No.: US 12,541,714 B2
(45) Date of Patent: Feb. 3, 2026

(54) DATA SELECTION FOR AUTOMATED RETRAINING IN CASE OF DRIFTS IN ACTIVE LEARNING

(71) Applicant: International Business Machines Corporation, Armonk, NY (US)

(72) Inventors: Amadou Ba, Navan (IE); Venkata Sitaramagiridharganesh Ganapavarapu, Elmsford, NY (US); Seshu Tirupathi, Dublin (IE); Bradley Eck, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 715 days.

(21) Appl. No.: 17/936,491

(22) Filed: Sep. 29, 2022

(65) Prior Publication Data

US 2024/0112066 A1    Apr. 4, 2024

(51) Int. Cl.
    *G06N 20/00*    (2019.01)
(52) U.S. Cl.
    CPC .................................. *G06N 20/00* (2019.01)
(58) Field of Classification Search
    CPC ...................................................... G06N 20/00
    See application file for complete search history.

(56) References Cited

U.S. PATENT DOCUMENTS

| | | |
|---|---|---|
| 7,660,715 B1 | 2/2010 | Thambiratnam |
| 10,163,061 B2 | 12/2018 | Grove |
| 10,614,373 B1 | 4/2020 | Jeffery |
| 10,755,196 B2 | 8/2020 | Fano |
| 10,902,039 B2 | 1/2021 | Ginsberg |
| 10,949,764 B2 | 3/2021 | Shao |
| 10,984,338 B2 | 4/2021 | Morris, II |
| 11,227,192 B1 | 1/2022 | Rahnama-Moghaddam et al. |
| 2012/0284213 A1 | 11/2012 | Lin |

(Continued)

FOREIGN PATENT DOCUMENTS

CN    112765787 A    5/2021

OTHER PUBLICATIONS

Zliobaite et al., "Active Learning With Drifting Streaming Data", IEEE Transactions on Neural Networks and Learning Systems, vol. 25, No. 1, Jan. 2014, 13 pages.

(Continued)

*Primary Examiner* — Pei Yong Weng
(74) *Attorney, Agent, or Firm* — James L. Olsen

(57) ABSTRACT

A computer-implemented method, a computer program product, and a computer system for retraining a model in case of a drift in machine learning. A computer detects a drift in machine learning. A computer identifies in a database features and a response of a machine learning model. A computer determines a time window of the drift. A computer extracts, from the database, data of the features and the response in the time window. A computer determines whether extracted data is sufficient for retraining the machine learning model. A computer, in response to determining that the extracted data is not sufficient for retraining the machine learning model, interpolates one or more of the features for a predetermined future time horizon. A computer interpolates a response corresponding to one or more interpolated features. A computer retrains the machine learning model, using the one or more interpolated features and an interpolated response corresponding thereto.

15 Claims, 5 Drawing Sheets

(56) References Cited

U.S. PATENT DOCUMENTS

| | | |
|---|---|---|
| 2020/0394469 A1 | 12/2020 | Kothuvatiparambil |
| 2020/0410403 A1 | 12/2020 | Kamulete |
| 2021/0073627 A1 | 3/2021 | Sarferaz |
| 2022/0036201 A1 | 2/2022 | Tamir et al. |

OTHER PUBLICATIONS

Porwik et al., "Detection of data drift in a two-dimensional stream using the Kolmogorov-Smirnov test", Procedia Computer Science 207 (2022), pp. 168-175.

DATA SELECTION FOR AUTOMATED RETRAINING IN CASE OF DRIFTS IN ACTIVE LEARNING

BACKGROUND

The present invention relates generally to machine learning, and more particularly to data selection for automated retraining in case of drifts in active learning.

In active learning which is a special case of machine learning, a learning algorithm can interactively query a user or another information source to label new data points with the desired outputs. In active learning, a drift is discrepancy between prediction by an active leaning model and actual detected data. Degradation of model performance due to the drift necessitate retraining of the active leaning model.

Several approaches to retraining machine learning models exist, including periodic retraining, online learning, and retraining based on drift detection. The periodic retraining may present issues, for example, when an environment associated to data changes or a drift occurs before the retraining is due or when the retraining is conducted when it is not needed. Data from a retraining period may not be enough or sufficient, data selection is challenging. The online approaches update models upon arrival of samples; this process is expensive particularly when updating or retraining models happens when it is not needed. The retraining based on drifts detection presents the challenge associated to the availability of required data for retraining.

SUMMARY

In one aspect, a computer-implemented method for retraining a model in case of a drift in machine learning is provided. The computer-implemented method includes detecting a drift in machine learning. The computer-implemented method further includes identifying in a database features and a response of a machine learning model. The computer-implemented method further includes determining a time window of the drift. The computer-implemented method further includes extracting, from the database, data of the features and the response in the time window. The computer-implemented method further includes determining whether extracted data is sufficient for retraining the machine learning model. The computer-implemented method further includes, in response to determining that the extracted data is not sufficient for retraining the machine learning model, interpolating one or more of the features for a predetermined future time horizon. The computer-implemented method further includes interpolating a response corresponding to one or more interpolated features. The computer-implemented method further includes retraining the machine learning model, using the one or more interpolated features and an interpolated response corresponding thereto.

In another aspect, a computer program product for retraining a model in case of a drift in machine learning is provided. The computer program product comprises a computer readable storage medium having program instructions embodied therewith, and the program instructions are executable by one or more processors. The program instructions are executable to: detect a drift in machine learning; identify in a database features and a response of a machine learning model; determine a time window of the drift; extract, from the database, data of the features and the response in the time window; determine whether extracted data is sufficient for retraining the machine learning model; in response to determining that the extracted data is not sufficient for retraining the machine learning model, interpolate one or more of the features for a predetermined future time horizon; interpolate a response corresponding to one or more interpolated features; and retrain the machine learning model, using the one or more interpolated features and an interpolated response corresponding thereto.

In yet another aspect, a computer system for retraining a model in case of a drift in machine learning is provided. The computer system comprises one or more processors, one or more computer readable tangible storage devices, and program instructions stored on at least one of the one or more computer readable tangible storage devices for execution by at least one of the one or more processors. The program instructions are executable to detect a drift in machine learning. The program instructions are further executable to identify in a database features and a response of a machine learning machine learning model. The program instructions are further executable to determine a time window of the drift. The program instructions are further executable to extract, from the database, data of the features and the response in the time window. The program instructions are further executable to determine whether extracted data is sufficient for retraining the machine learning model. The program instructions are further executable to, in response to determining that the extracted data is not sufficient for retraining the machine learning model, interpolate one or more of the features for a predetermined future time horizon. The program instructions are further executable to interpolate a response corresponding to one or more interpolated features. The program instructions are further executable to retrain the machine learning model, using the one or more interpolated features and an interpolated response corresponding thereto.

DETAILED DESCRIPTION

Embodiments of the present invention disclose a method for data selection or creation for retraining a model in case of a drift in active learning. Embodiments of the present invention disclose a backfilling prediction approach to reconstruct a model in case of a drift. Embodiments of the present invention disclose a database that stores feature and response variables and allows to select a subset of the feature and response variables needed for retraining a model in cases of a drift. Embodiments of the present invention disclose a mechanism of interpolating features that need to be used for retraining a model in case of a drift. Embodiments of the present invention disclose a method that uses results of drift detection to activate a feature selector or creator.

In embodiments of the present invention, a disclosed method uses feature and response variables stored in a database to select one or more relevant subsets that are needed for retraining a model in case of a drift. In embodiments of the present invention, in case of a drift, a disclosed method analyzes new changes in data and explores a database to detect similar or closest behaviors in the data stored in the database. By detecting the similar or closest behaviors, a disclosed method learns a new model or retrains a model. In embodiments of the present invention, a disclosed method assesses a new model or retrained model to infer performance of the new model or retrained model.

Figure 1:
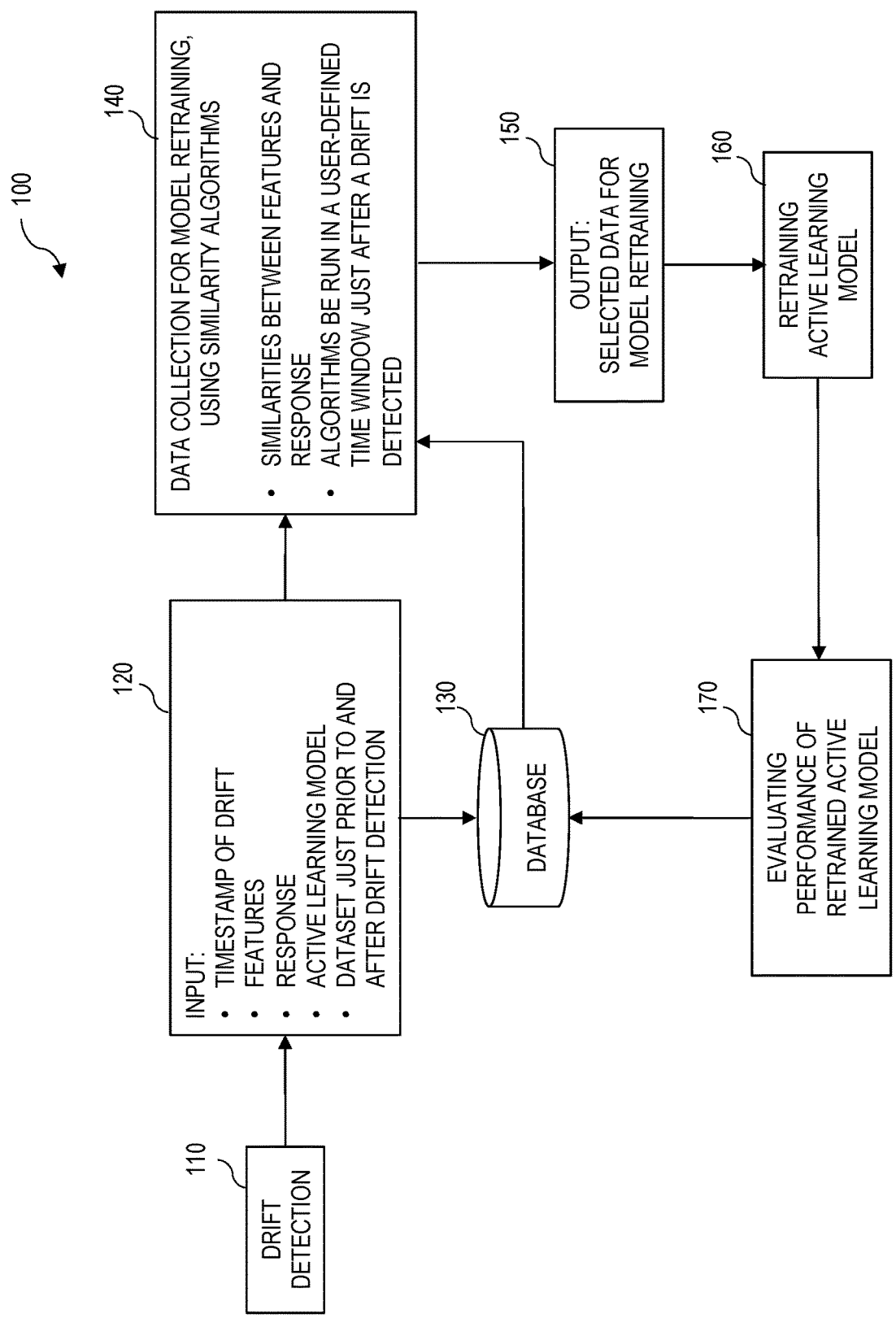
FIG. 1 illustrates a system of data selection for automated retraining in case of drifts in active learning, in accordance with one embodiment of the present invention.

FIG. 1 illustrates system 100 of data selection for automated retraining in case of drifts in active learning, in accordance with one embodiment of the present invention. System 100 includes module 110 of drift detection. System 100 receives input 120 which includes a timestamp of the drift, features, a response, an active learning model, and a dataset in a time window between just prior to the drift and after the drift. System 100 stores input 120 in database 130.

System 100 further includes module 140 of data collection for model retraining. The data collection uses similarity algorithms, including dynamic time wrapping, correlation methods, clustering techniques, and classification approaches. For collecting data, module 140 of data collection for model retraining uses data stored in database 130. Output 150 of module 140 of data collection for model retraining includes selected data for model retraining.

System 100 further includes module 160 of retraining the active learning model. Selected data for model retraining (output 150) is fed to module 160 of retraining the active learning model. Module 160 retrains the active learning model, using the selected data for model retraining (output 150).

System 100 further includes module 170 of evaluating performance of a retrained active learning model. Module 170 uses performance metrics to evaluate the performance of the active learning model which is retrained by module 160 of retraining the active learning model. The performance metrics are mathematical equations indicating how the active learning model performs in terms of prediction, for example. Module 170 stores in database 130 the results of evaluating performance of the retrained active learning model.

Figure 2:
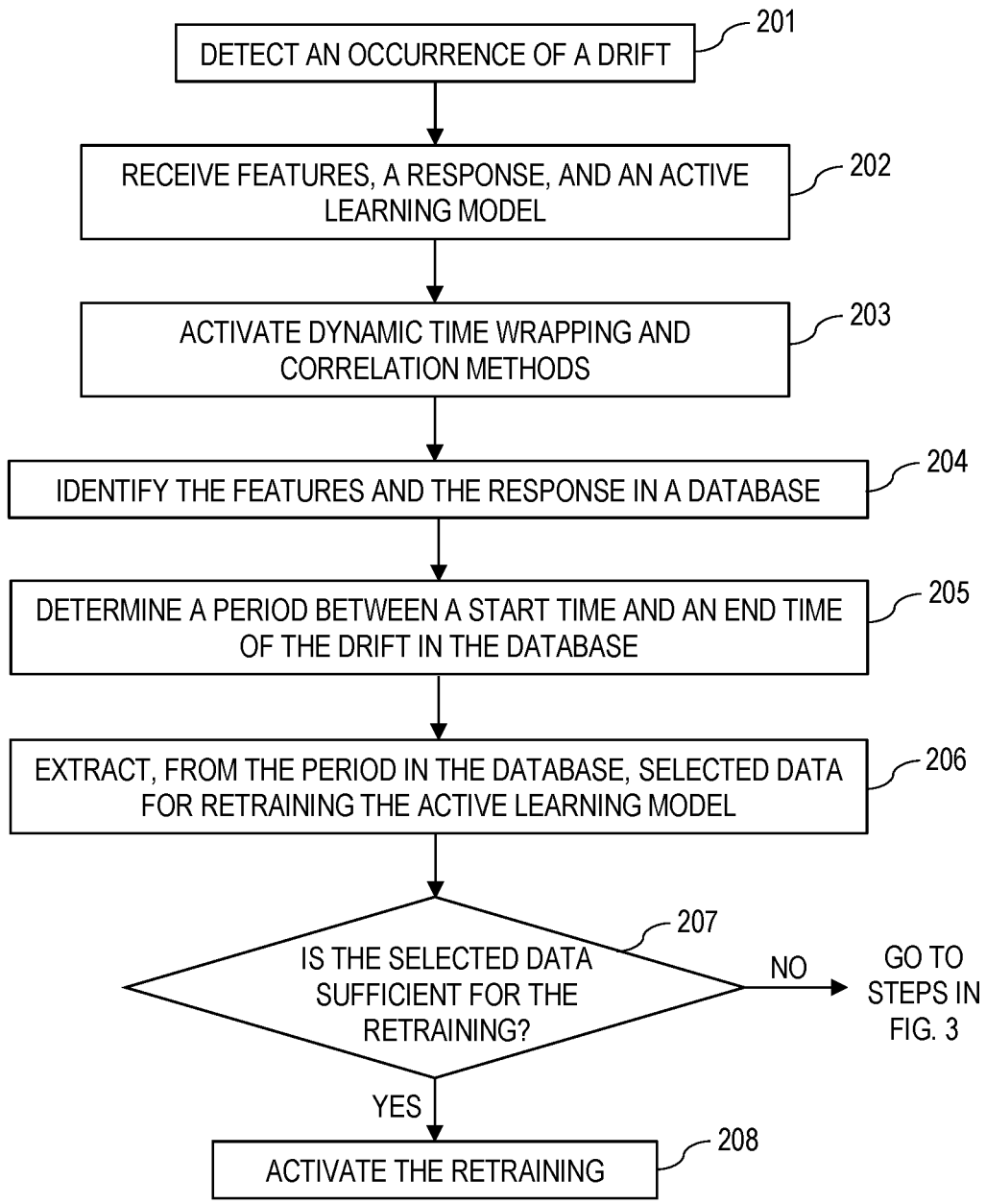
FIG. 2, FIG. 3, and FIG. 4 are flowcharts showing operational steps of data selection for automated retraining in case of drifts in active learning, in accordance with one embodiment of the present invention.
Figure 3:
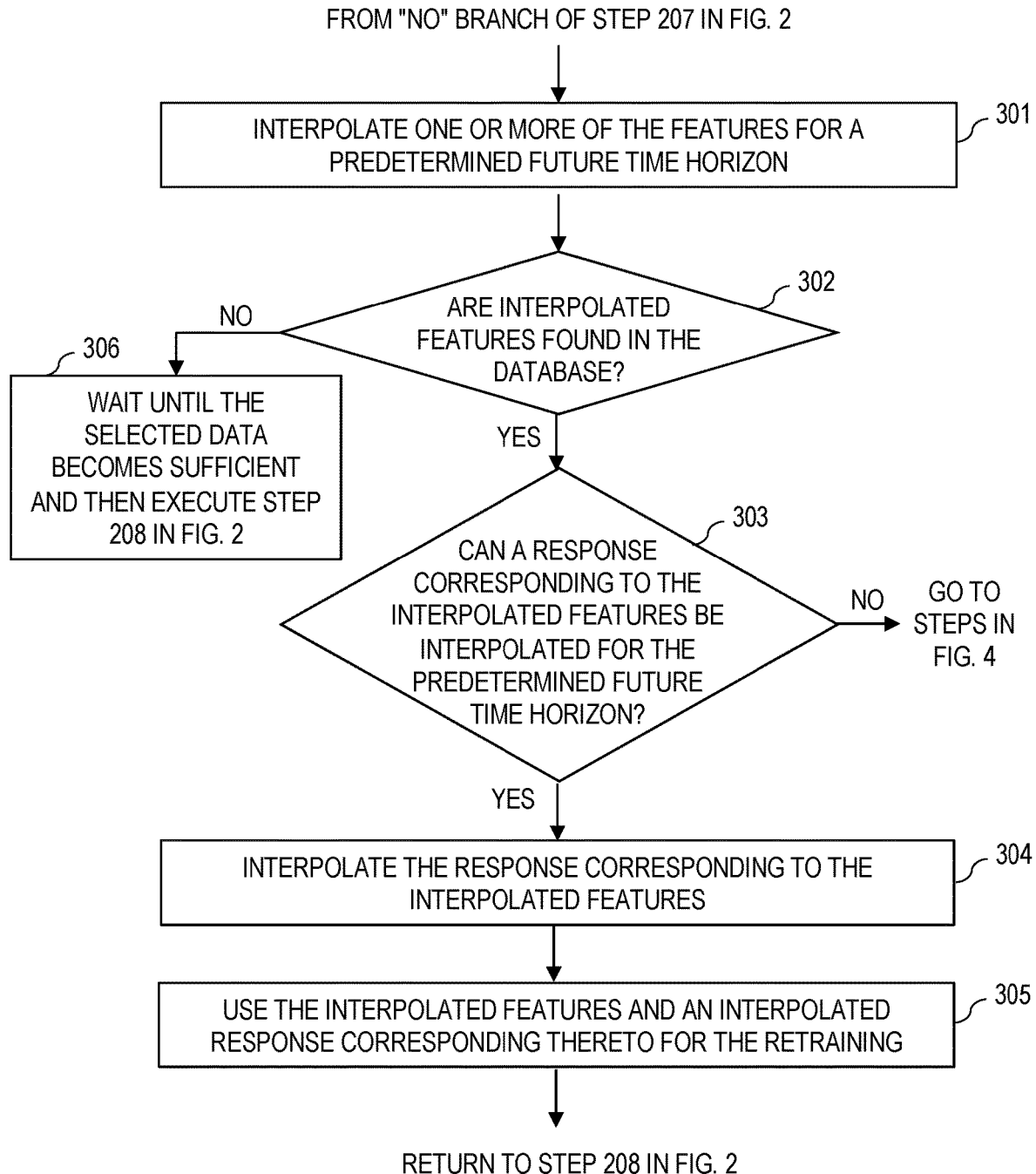
Figure 4:
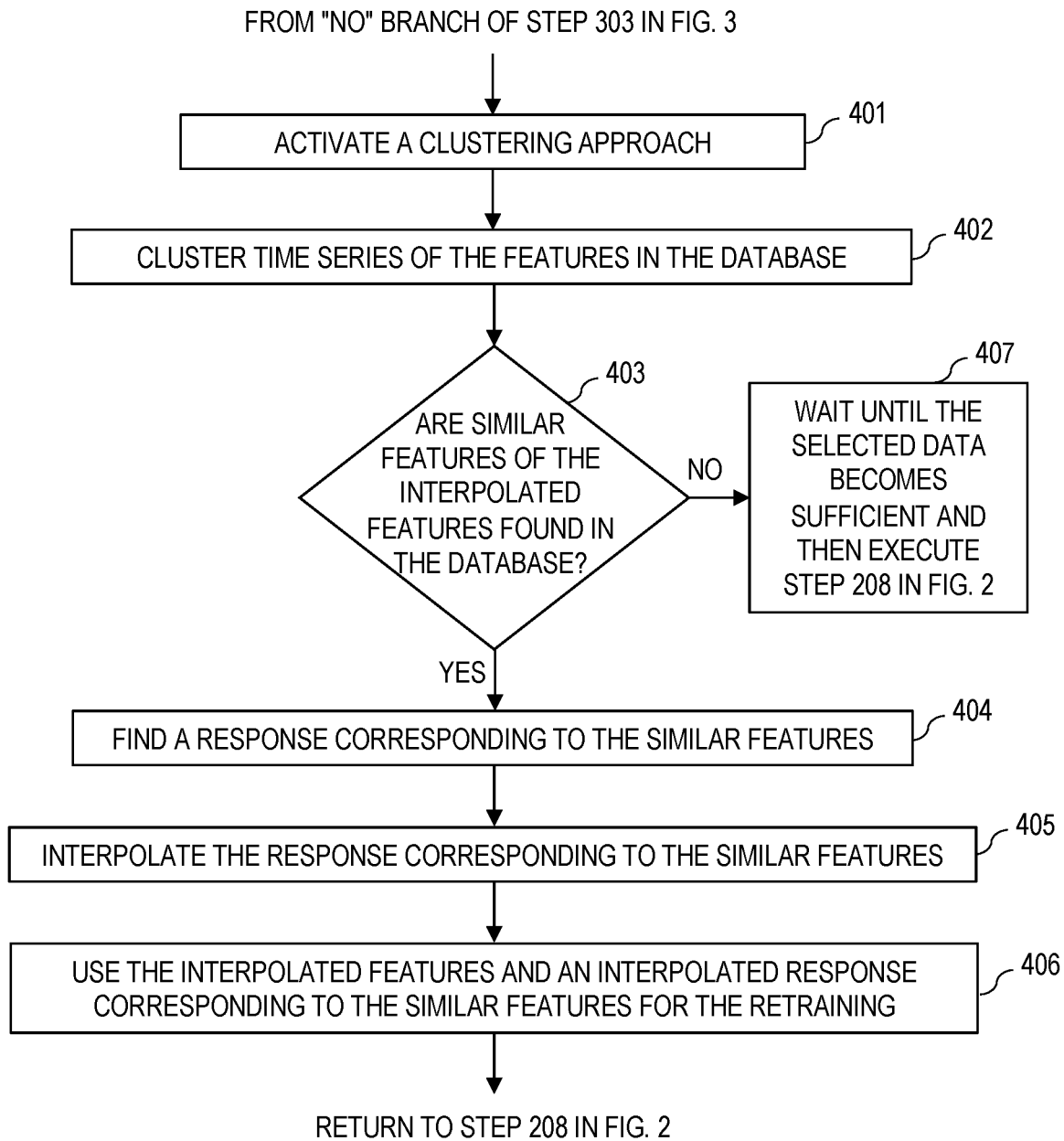

FIG. 2, FIG. 3, and FIG. 4 are flowcharts showing operational steps of data selection for automated retraining in case of drifts in active learning, in accordance with one embodiment of the present invention. The operational steps are implemented by a computer or server (such as computer 501 in FIG. 5).

Referring to FIG. 2, in step 201, the computer or server detects an occurrence of a drift. The drift is discrepancy between prediction by an active leaning model and actual detected data. In an example shown in FIG. 1, module 110 of drift detection detects the occurrence of the drift.

In step 202, the computer or server receives features, a response, and an active learning model. The features are independent variables of the active learning model, and the response is a dependent variable of the active learning model. In an example shown in FIG. 1, system 100 receives the features, the response, and the active learning model included in input 120.

In step 203, the computer or server activates dynamic time wrapping and correlation methods. In general, the computer or server activates similarity algorithms and uses similarity algorithms to compute similarity between datasets. In an example shown in FIG. 1, system 100 activates the similarity algorithms.

In step 204, the computer or server identifies the features and the response in a database. In step 205, the computer or server determines a period between a start time and an end time of the drift in the database. The period is a time window between just prior to the drift and after the drift. In an example shown in FIG. 1, system 100 determines the features and the response in database 130 and determines the period or the time windows in database 130.

In step 206, the computer or server extracts, from the period (or the time window) in the database, selected data for retraining the active learning model. The computer or server extracts data of the features and the response in the database. The extracted data is within the time window determined in step 205. In an example shown in FIG. 1, system 100 extracts the data in database 130 and obtains the selected data for model retraining (output 150).

In step 207, the computer or server determines whether the selected data is sufficient for retraining the active learning model. Retraining the active learning model requires a certain quantity of the selected data or a sufficient quantity of the selected data. The extract data of the features and the response in the time window from the database must be sufficient.

In response to determining that the selected data is sufficient for retraining the active learning model (YES branch of step 207), in step 208, the computer or server activates retraining the active learning model. The computer or server retrains the active learning model using the selected data. In an example shown in FIG. 1, system 100 activates module 160 of retraining the active learning model and retrains the active learning model using selected data for model retraining (output 150).

In response to determining that the selected data is not sufficient for retraining the active learning model (NO branch of step 207), the computer or server will execute steps in FIG. 3. The steps in FIG. 3 will be discussed in later paragraphs.

Referring to FIG. 3, in step 301, following the NO branch of step 207 in FIG. 2, the computer or server interpolates one or more of the features for a predetermined future time horizon. In stream-based active learning, the retraining is complex, because at the time of a drift the size of data available for retraining is usually insufficient. However, certain features can be interpolated into the future; for example, for electricity load forecasting occupancy forecasting, the time of the day, and the weather may be features to be interpolated into a future time horizon. In an example shown in FIG. 1, system 100 interpolates the one or more of the features.

In step 302, the computer or server determines whether one or more interpolated features are found in the database. In an example shown in FIG. 1, system 100 determines whether the one or more interpolated features are found in database 130.

In response to determining that the one or more interpolated features are not found in the database (NO branch of step 302), the computer or server in step 306 waits until the selected data becomes sufficient and then executes step 208 in FIG. 2 (or retrains the active learning model using the selected data). The computer or server keeps extracting the selected data for a longer period of time and checking whether the selected data is sufficient for retraining. As shown in FIG. 2, once the computer or server determines the selected data becomes sufficient, the computer or server activates retraining the active learning model and retrains the active learning model using the selected data.

In response to determining that the one or more interpolated features are found in the database (YES branch of step 302), in step 303, the computer or server determines whether a response corresponding to the one or more interpolated features can be interpolated for the predetermined future time horizon.

In response to the response corresponding to the one or more interpolated features cannot be interpolated for the predetermined future time horizon (NO branch of step 303), the computer or server will execute steps in FIG. 4. The steps in FIG. 4 will be discussed in later paragraphs.

In response to determining that the response corresponding to the one or more interpolated features can be interpolated for the predetermined future time horizon (YES branch of step 303), in step 304, the computer or server interpolates the response corresponding to the one or more interpolated features. The computer or server interpolates the response for the predetermined future time horizon. Then, in step 305, the computer or server uses the one or more interpolated features and an interpolated response corresponding thereto for retraining the active learning model. The interpolated response corresponding to the one or more interpolated features is obtained in step 304.

Due to the selected data being insufficient for the retraining (as determined in step 207), steps 301-305 in FIG. 3 are implemented to obtain sufficient data for retraining the active learning model. The data for training includes the one or more interpolated features and the interpolated response. Now, the computer or server returns to step 208 in FIG. 2 to activate retraining the active learning model.

Now, referring to FIG. 4, in step 401, following the NO branch of step 303 in FIG. 3, in step 401, the computer or server activates a clustering approach. In step 402, using the clustering approach, the computer or server clusters time series of the features in the database. In an example shown in FIG. 1, system 100 clusters time series of the features stored in database 130.

In step 403, through clustering the time series of the features, the computer or server determines whether similar features of the interpolated features are found in the database. In response to determining that the similar features of the interpolated features are not found in the database (NO branch of step 403), the computer or server in step 407 waits until the selected data becomes sufficient and then execute step 208 in FIG. 2.

In response to determining that the similar features of the interpolated features are found in the database (YES branch of step 403), in step 404, the computer or server finds in the database a response corresponding to the similar features. In an example shown in FIG. 1, in database 130, system 100 finds the response corresponding to the similar features.

In step 405, the computer or server interpolates the response corresponding to the similar features for the predetermined future time horizon. In step 406, the computer or server uses the interpolated features and an interpolated response corresponding to the similar features for retraining the active learning model. The interpolated response corresponding to the similar features is obtained in step 405.

Due to the selected data being insufficient for the retraining (as determined in step 207) and the response corresponding to the one or more interpolated features being unable to be interpolated (as determined in step 303), steps 401-406 in FIG. 4 are implemented to obtain sufficient data for retraining the active learning model. The data for training includes the interpolated features and the interpolated response corresponding to the similar features. Now, the computer or server returns to step 208 in FIG. 2 to activate retraining the active learning model.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 5:
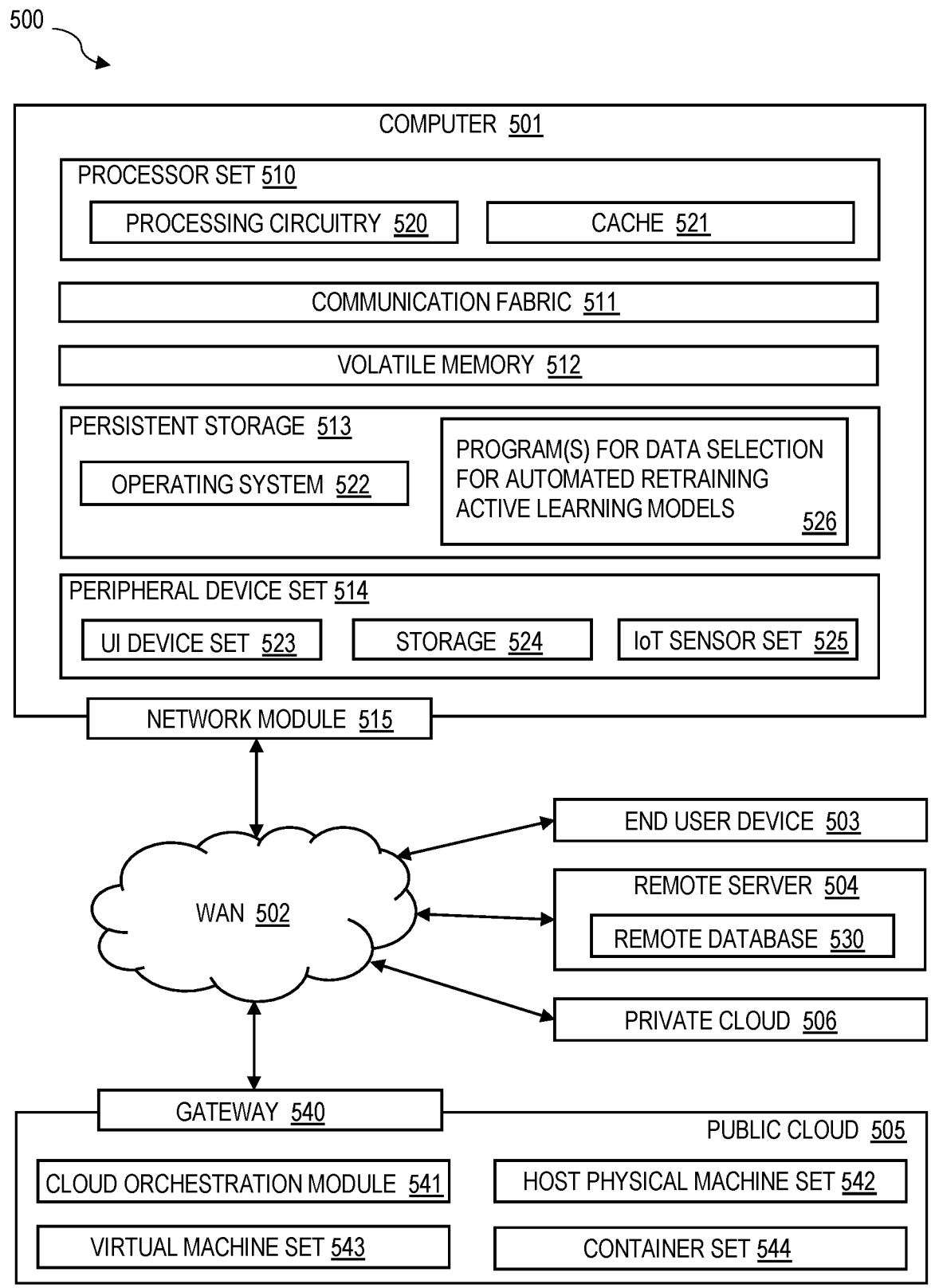
FIG. 5 is a systematic diagram illustrating an example of an environment for the execution of at least some of the computer code involved in performing data selection for automated retraining in case of drifts in active learning, in accordance with one embodiment of the present invention.

In FIG. 5, computing environment 500 contains an example of an environment for the execution of at least some of the computer code involved in performing the inventive methods, such as such as program(s) 526 for data selection for automated retraining in case of drifts in active learning. In addition to block 526, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 526, as identified above), peripheral device set 514 (including user interface (UI) device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

Computer 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

Processor set 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in block 526 in persistent storage 513.

Communication fabric 511 is the signal conduction paths that allow the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 512 is any type of volatile memory now known or to be developed in the future. Examples include dynamic type random access memory (RAM) or static type RAM. Typically, the volatile memory is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

Persistent storage 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface type operating systems that employ a kernel. The code included in block 526 typically includes at least some of the computer code involved in performing the inventive methods.

Peripheral device set 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

Network module 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

Remote server 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

Public cloud 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

What is claimed is:

1. A computer-implemented method comprising:
   detecting a drift in a machine learning process;
   identifying, in a database, features and response variables of a machine learning model corresponding to the machine learning process;
   determining a time window of the drift;
   extracting, from the database, data of the features and the response variables in the time window;
   determining whether there is a threshold quantity of extracted data for retraining the machine learning model;
   in response to determining that there is not the threshold quantity of extracted data for retraining the machine learning model, interpolating one or more of the features for a predetermined future time horizon;
   interpolating response variables corresponding to one or more interpolated features; and
   retraining the machine learning model, using the one or more interpolated features and the interpolated response variables corresponding thereto.

2. The computer-implemented method of claim 1, further comprising:
   in response to determining that there is the threshold quantity of the extracted data for retraining the machine learning model, retraining the machine learning model using the extracted data.

3. The computer-implemented method of claim 1, further comprising:

in response to determining that the one or more interpolated features cannot be found in the database, waiting until there is the threshold quantity of the extracted data and then retraining the machine learning model using the extracted data.

4. The computer-implemented method of claim 1, further comprising:
in response to determining that the response corresponding to the one or more interpolated features cannot be interpolated for the predetermined future time horizon, clustering time series of the features in the database;
determining whether similar features of the interpolated features are found in the database;
in response to determining that the similar features of the interpolated features are found in the database, finding response variables corresponding to the similar features;
interpolating the response variables corresponding to the similar features for the predetermined future time horizon; and
retraining the machine learning model, using the one or more interpolated features and interpolated response variables corresponding to the similar features.

5. The computer-implemented method of claim 4, further comprising:
in response to determining that the similar features of the interpolated features are not found in the database, waiting until there is the threshold quantity of the extracted data and then retraining the machine learning model using the extracted data.

6. A computer program product comprising:
one or more computer-readable storage media; and
program instructions stored on the one or more computer-readable storage media to perform operations comprising:
detecting a drift in a machine learning process;
identifying, in a database, features and response variables of a machine learning model corresponding to the machine learning process;
determining a time window of the drift;
extracting, from the database, data of the features and the response in the time window;
determining whether there is a threshold quantity of extracted data for retraining the machine learning model;
in response to determining that there is not the threshold quantity of extracted data for retraining the machine learning model, interpolating one or more of the features for a predetermined future time horizon;
interpolating response variables corresponding to one or more interpolated features; and
retraining the machine learning model, using the one or more interpolated features and the interpolated response variables corresponding thereto.

7. The computer program product of claim 6, wherein the operations further comprise:
in response to determining that there is the threshold quantity of the extracted data for retraining the machine learning model, retraining the machine learning model using the extracted data.

8. The computer program product of claim 6, wherein the operations further comprise:
in response to determining that the one or more interpolated features cannot be found in the database, waiting until there is the threshold quantity of the extracted data and then retraining the machine learning model using the extracted data.

9. The computer program product of claim 8, wherein the operations further comprise:
in response to determining that the response corresponding to the one or more interpolated features cannot be interpolated for the predetermined future time horizon, clustering time series of the features in the database;
determining whether similar features of the interpolated features are found in the database;
in response to determining that the similar features of the interpolated features are found in the database, finding response variables corresponding to the similar features;
interpolating the response variables corresponding to the similar features for the predetermined future time horizon; and
retraining the machine learning model, using the one or more interpolated features and the interpolated response variables corresponding to the similar features.

10. The computer program product of claim 9, wherein the operations further comprise:
in response to determining that the similar features of the interpolated features are not found in the database, waiting until there is the threshold quantity of the extracted data and then retraining the machine learning model using the extracted data.

11. A computer system comprising:
a processor set;
one or more computer-readable storage media; and
program instructions stored on the one or more computer-readable storage media to cause the processor set to perform operations comprising:
detecting a drift in a machine learning process;
identifying, in a database, features and response variables of a machine learning model corresponding to the machine learning process;
determining a time window of the drift;
extracting, from the database, data of the features and the response in the time window;
determining whether there is a threshold quantity of extracted data for retraining the machine learning model;
in response to determining that there is not the threshold quantity of extracted data for retraining the machine learning model, interpolating one or more of the features for a predetermined future time horizon;
interpolating response variables corresponding to one or more interpolated features; and
retraining the machine learning model, using the one or more interpolated features and the interpolated response variables corresponding thereto.

12. The computer system of claim 11, wherein the operations further comprise:
in response to determining that there is the threshold quantity of the extracted data for retraining the machine learning model, retraining the machine learning model using the extracted data.

13. The computer system of claim 11, wherein the operations further comprise:
in response to determining that the one or more interpolated features cannot be found in the database, waiting until there is the threshold quantity of the extracted data and then retraining the machine learning model using the extracted data.

14. The computer system of claim 11, wherein the operations further comprise:
- in response to determining that the response corresponding to the one or more interpolated features cannot be interpolated for the predetermined future time horizon, clustering time series of the features in the database;
- determining whether similar features of the interpolated features are found in the database;
- in response to determining that the similar features of the interpolated features are found in the database, finding response variables corresponding to the similar features;
- interpolating the response variables corresponding to the similar features for the predetermined future time horizon; and
- retraining the machine learning model, using the one or more interpolated features and the interpolated response variables corresponding to the similar features.

15. The computer system of claim 14, wherein the operations further comprise:
- in response to determining that the similar features of the interpolated features are not found in the database, waiting until there is the threshold quantity of the extracted data and then retraining the machine learning model using the extracted data.

* * * * *